July 15, 1952  L. J. GIACOLETTO  2,603,687
MAGNETOMETER
Filed Sept. 22, 1949

Inventor
LAWRENCE J. GIACOLETTO
By Morris ...
Attorney

Patented July 15, 1952

2,603,687

UNITED STATES PATENT OFFICE 2,603,687

MAGNETOMETER

Lawrence J. Giacoletto, Eatontown, N. J., assignor to Radio Corporation of America, a corporation of Delaware Application September 22, 1949, Serial No. 117,086

7 Claims. (Cl. 175—183)

My invention relates to improvements in apparatus for measuring magnetic fields, and particularly to apparatus for measuring the field strength, or the direction, or both, of a magnetic field. For simplicity, an apparatus of this kind will be referred to herein and in the appended claims as a magnetometer.

Magnetometers have already been proposed which depend for their operation on the deflecting effect of a magnetic field on a beam of electrons, and it is to the improvement of magnetometers of this general character that the present invention is directed.

It is a principal object of my invention to provide an improved magnetometer of the electron-beam-deflection type, and one which shall produce automatically an accurate and continuous indication of magnetic field intensity.

A further object of my invention is to provide an improved magnetometer of the beam-deflection type which is adaptable either to magnetic field strength measurements or to field direction measurements, or both.

Another object of my invention is to provide an improved magnetometer adapted for measuring magnetic fields of small volume and in difficultly accessible regions.

A further object of my invention is to provide an improved apparatus for making continuous, automatic measurements of magnetic fields in a manner adaptable to magnetic field control systems and the like.

In accordance with my invention, the foregoing and other related objects and advantages are attained by providing an electron discharge device which will produce an output pulse of voltage only when an electron beam established therein is deflected along a predetermined path by a magnetic field. When the device is placed within any given field to be measured, electrons will be deflected along the predetermined path only when the voltage on a beam deflection control electrode of the device has a predetermined value. A circuit is provided which will produce an indication of the beam deflection electrode voltage automatically whenever an electron is deflected along the predetermined path within the discharge device, thereby providing a measurement of the magnetic field causing the deflection.

A more complete understanding of the invention can be had by reference to the following description of an illustrative embodiment thereof when considered in connection with the accompanying drawing, in which.

Figure 1:
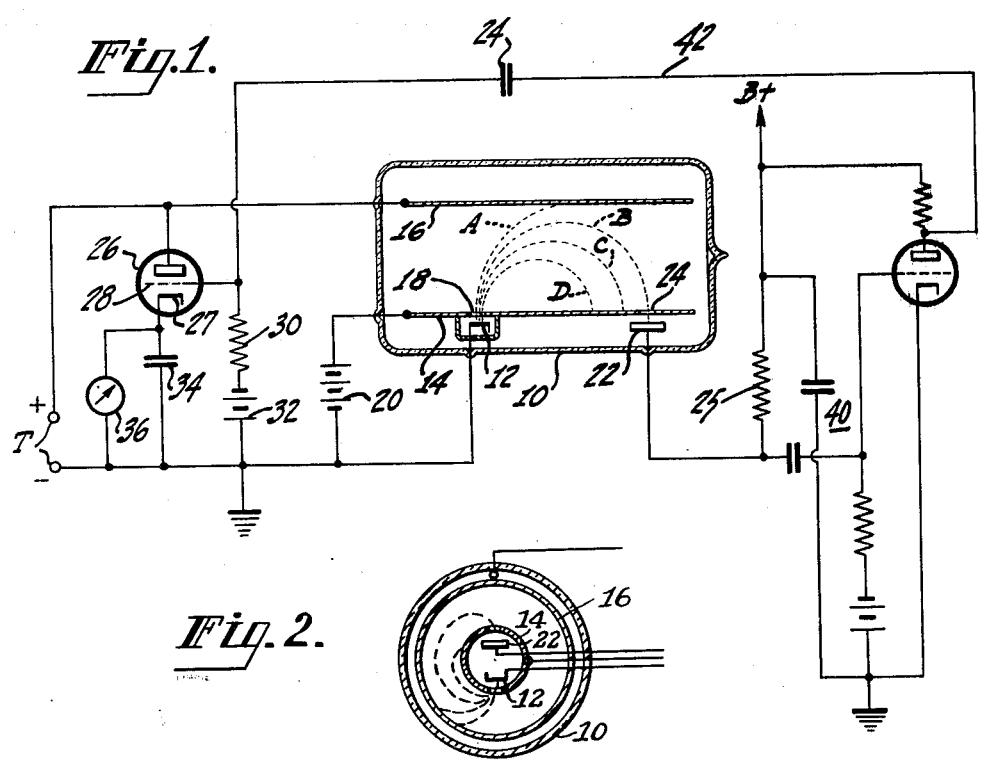
Fig. 1 illustrates a magnetometer embodying the principles of my invention.

Referring to Fig. 1 of the drawing, there is shown an electron discharge device 10 having a cathode 12, which serves as a source of electrons, and a pair of electrodes 14, 16, for forming and controlling a beam of electrons. The electrode 14 has an aperture 18 therein through which electrons can pass from the cathode 12 to form an electron beam directed toward the electrode 16. The electrons from the cathode 12 preferably are given a small component of acceleration by a voltage applied between the cathode 12 and the electrode 14 from a voltage source 20. The tube 10 also contains an electron collecting electrode or anode 22 disposed adjacent to a second aperture 24 in the plate 14 to collect electrons passing through the aperture 24. The electrodes 14, 16 are connected to a pair of input terminals T through which a deflection control voltage can be applied to said electrodes, and the anode 22 is connected to a voltage source B+ through a resistor 25.

Assuming that the discharge device 10 is placed in a magnetic field, with the lines of flux in the field being directed into the plane of the drawing, and assuming, for the moment, that the terminals T are connected to an adjustable magnitude unidirectional voltage source (not shown) of the polarity indicated, it can be seen that electrons will start from the cathode 12 toward the electrode 16 but will be deflected by the magnetic field along a path A, B, C, or D depending on the magnitude of the voltage at the terminals T and the strength of the magnetic field. For some set of values of input voltage and magnetic field strength, the electrons will follow the path B and will pass through the aperture 24, striking the anode 22. By connecting an ammeter in circuit with the anode 22 and adjusting the input voltage at the terminals T to produce maximum anode current, it is apparent that the input voltage required to produce maximum anode current could be taken as a relative measure of magnetic field strength. However, such a measuring procedure is relatively laborious and time consuming, and is not necessary with the apparatus shown.

If an alternating voltage is applied to the input terminals T, it can be seen that, for a given strength of magnetic field, the deflection path of the electrons will move progressively through the positions D, C, B, A, and back again, during each positive half cycle of the alternating input voltage. Consequently, with a given magnetic field, the electron beam will pass through the aperture 24 at least once, and possibly twice, during each positive half cycle of input voltage. In either event, the magnitude of the input voltage at the instant when the electron beam strikes the anode 22 will be proportional to the magnetic field strength, and an accurate measurement of this instantaneous voltage value will be an equally accurate magnetic field measurement. The remainder of the apparatus shown in Fig. 1 is provided to accomplish this measuring function.

An electron tube 26 is connected to the terminals T to receive an anode voltage corresponding to the voltage between the electrodes 14, 16. The control grid 28 of the tube 26 is connected through a resistor 30 to a bias voltage source 32 which is made large enough so that the tube 26 ordinarily will not conduct current during any portion of the input voltage wave. The cathode 27 of the tube 26 is connected to a capacitor 34 having a voltmeter 36 connected in parallel therewith so that the voltmeter 36 will measure and indicate any voltage developed across the capacitor 34 by current flow in the tube 26.

An amplifying network 40 is connected to amplify the pulses of voltage which will be generated at the anode 22 of the device 10 each time the electron beam passes the aperture 24. The amplified voltage pulses will be passed back to the grid 28 of the tube 26 along a lead 42 and through a coupling capacitor 24, and will overcome the bias voltage of the source 32, causing the tube 26 to conduct current for a brief instant. Immediately thereafter, the tube 26 again will be cut off by the bias voltage from the source 32. Since the input voltage required to cause electrons to reach the anode 22 will always be the same for any given magnetic field, the capacitor 34 will receive a short burst of current each time the input voltage wave passes through the proper value, and the capacitor 34 will become charged to a value corresponding to that proper value of input voltage. Thus, the voltage on the capacitor 34 will be directly related to the magnitude of the input voltage at the instant electrons reach the anode 22 and, hence, an accurate indication of a value proportional to the intensity of the magnetic field will be obtained on the voltmeter 36. It will, of course, be understood that the voltmeter 36 actually measures the average value of the current through the tube 26.

If the apparatus is to be used to determine the direction of a magnetic field, the device 10 should be moved about until a maximum indication is obtained on the voltmeter 36. In the case of a discharge device having a configuration identical with that of the device 10 shown in Fig. 1, the magnetic field being investigated would be mutually perpendicular to the edges of the electrodes 14, 16, and to a line joining the electrodes 14, 16.

If desired, the apparatus shown can be utilized as an automatic field control device by suitable connections from the capacitor 34 to a field control unit. For example, the field control unit may comprise an electron tube having its grid bias controlled by the voltage across the capacitor 34.

Figure 2:
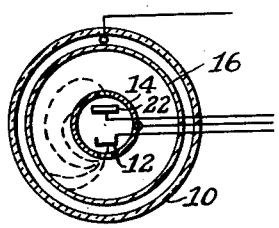
Fig. 2 shows a slightly different type of beam deflection tube which can be used in practising the invention.

It is evident that the tube 10 of Fig. 1 can have a number of different configurations. For example, the electrodes 14, 16 may comprise two parallel plates as shown in Fig. 1, or may comprise two coaxially arranged cylindrical plates as shown in Fig. 2, with the cathode 12 and the anode 22 being disposed within the inner plate 14. Also, it is to be noted that the spacing between the plates 14, 16 need not be very great, so that the tube 10 can be made very small for operation in confined or restricted areas with magnetic fields of small volume, such as in the center of a solenoid or the like.

It will be evident that the voltage supplied to the terminals T can have any desired waveshape without substantially changing the described mode of operation of the device, although a linearly varying voltage with quick return to zero (e. g. a "sawtooth" voltage) is deemed preferable since the accuracy of measurement of the magnetic field would then be independent of the magnitude thereof.

Ordinarily, the amplifying network 40 is advantageous for amplifying the voltage pulses developed at the anode 22. However, the network 40 can be eliminated by making the anode 22 a secondary emitter or dynode followed by one or more electron multiplier stages and a collecting electrode. An arrangement of this kind is shown in Fig. 3.

Figure 3:
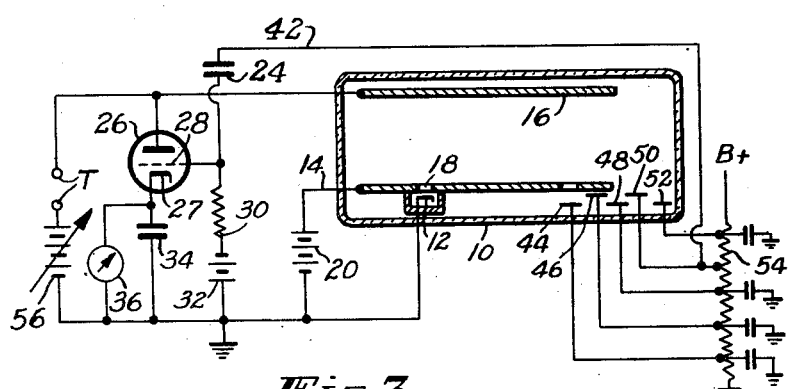
Fig. 3 illustrates a modified form of magnetometer embodying the principles of the invention.

In Fig. 3, a dynode 44 is disposed behind the aperture 24, and three additional dynodes 46, 48, 50 are provided to multiply the current emitted by the first dynode 44. A collector electrode 52 follows the last dynode 50. The dynode and collector voltages are obtained from tap points on a voltage divider resistor 54 connected across the voltage source B+. The tube 26 is connected to receive positive pulses from the last dynode 50 when electrons strike the first dynode 44. The operation of the circuit of Fig. 3 otherwise will be similar to the circuit of Fig. 1 except as noted hereinafter.

To accommodate large ranges of magnetic field measurement, electron discharge devices with different spacings between the electrodes 14, 16 may be provided, or the peak magnitude of the voltage applied to terminals T may be changed, or, preferably, the input voltage at the terminals T may comprise an adjustable unidirectional component of voltage added to a "fixed peak value" pulsating voltage, so that the zero point of measurement can be shifted by adjustments in the magnitude of the unidirectional voltage without changing the peak value of the pulsating voltage. This is illustrated by the variable voltage source 56 shown in Fig. 3 in series with the terminals T.

Since these as well as other similar changes could be made in the apparatus shown and described, all within the scope and spirit of the invention, the foregoing is to be construed as illustrative, and not in a limiting sense.

What is claimed is:

1. A magnetometer comprising an electron discharge device adapted to be placed in a magnetic field to be measured and including electrodes for generating a beam of electrons deflectable by said magnetic field, a pair of input terminals adapted to be connected to a source of voltage having varying instantaneous values, means in said device connected to said terminals to vary the deflection of said beam by said field in accordance with said voltage, means including an electron collecting electrode in said device to generate a voltage pulse upon deflection of said beam along a predetermined path in said device, and measuring means connected to said input terminals and to said pulse generating means and responsive to said voltage pulses to measure said voltage at the instant each said pulse is generated whereby to evaluate the deflecting effect of said field on said beam.

2. A magnetometer as defined in claim 1 wherein said measuring means comprises a circuit connected to said input terminals and including a normally non-conductive element connected to conduct current in an amount proportional to the instantaneous value of said voltage in response to pulses from said pulse generating means, and means connected in said circuit for measuring the average value of said current.

3. A magnetometer as defined in claim 2 wherein said normally non-conductive element comprises an electron tube having a current-control grid connected to said pulse generating means, and a source of bias voltage connected to said grid to prevent current flow in said tube prior to and after the generation of each said pulse.

4. Apparatus for measuring the deflecting effect of a magnetic field on an electron beam in an electron discharge device having electron beam generating, deflection control, and electron collecting electrodes, and wherein the deflection of said beam is a function both of the intensity of said magnetic field and of the voltage on said deflection control electrodes, said apparatus comprising a pair of terminals adapted to be connected to a varying voltage source and connected to said deflection control electrodes whereby to vary the deflection of said beam in accordance with said varying voltage, means to generate a pulse of voltage in response to deflection of said beam to said collecting electrode, and a measuring circuit connected between said terminals and said pulse generating means and responsive to said voltage pulse to measure said varying voltage at the instant said beam is deflected to said collecting electrode.

5. Apparatus as defined in claim 4 wherein said measuring circuit comprises an electron tube connected in series with a capacitor between said terminals, said electron tube having a current control grid connected to said pulse generating means, a bias voltage source connected to said grid and normally preventing conduction in said tube, and a voltmeter connected in parallel with said capacitor to measure the voltage across said capacitor, said tube being conductively responsive to said voltage pulses to charge said capacitor.

6. A magnetometer comprising a pair of input terminals adapted to be connected to a source of voltage having varying instantaneous values, an electron discharge device adapted to be placed in a magnetic field to be measured and having electrodes including a cathode and a beam deflection control electrode connected to said terminals for generating in response to said voltage a beam of electrons directed from said cathode toward said electrode and deflectable by said magnetic field, said device also including a collecting electrode disposed to collect electrons deflected by said field along a predetermined path, a network connected to said collecting electrode to generate voltage pulses in response to the arrival of electrons at said collecting electrode, and measuring means connected to said network and to said input terminals and responsive to said voltage pulses for measuring the magnitude of said voltage at the instant each of said voltage pulses is generated as a measure of the combined effect of said magnetic field and of said voltage on said beam.

7. A magnetometer as defined in claim 6 wherein said measuring means comprises a circuit including a capacitor and a normally non-conductive element connected in series between said input terminals, said element being connected to conduct current in response to voltage pulses from said pulse generating means whereby to charge said capacitor to a voltage corresponding to the value of said input voltage at the instant each said pulse is generated, and means to measure the voltage across said capacitor.

LAWRENCE J. GIACOLETTO.

REFERENCES CITED

The following references are of record in the file of this patent:

UNITED STATES PATENTS

| Number | Name | Date |
| --- | --- | --- |
| 2,165,307 | Skellett | July 11, 1939 |
| 2,175,702 | Rose | Oct. 10, 1939 |
| 2,358,901 | Ziebolz | Sept. 26, 1944 |
| 2,414,121 | Pierce | Jan. 14, 1947 |
| 2,528,437 | Joy | Oct. 31, 1950 |